United States Patent Office 3,092,549
Patented June 4, 1963

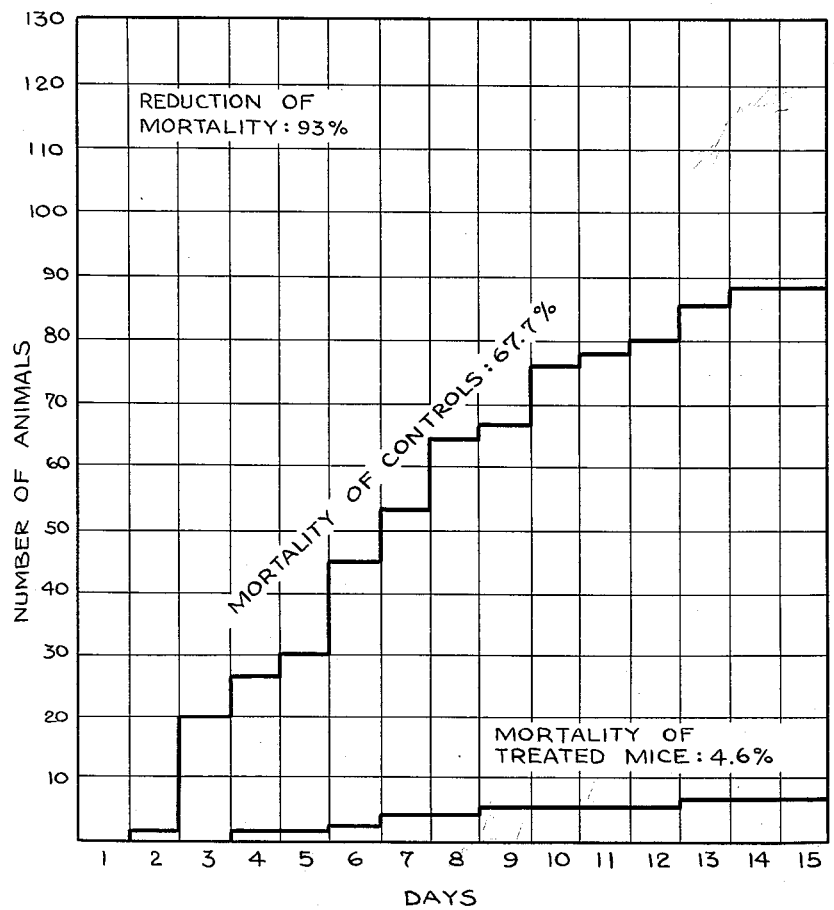

3,092,549
PROCESS OF AND COMPOSITION FOR COMBATING INFLUENZA VIRUS AND PROCESSES OF PREPARING THE ACTIVE CONSTITUENT THEREOF
André Georges Girard, Paris, France, assignor, by mesne assignments, to Roussel-UCLAF, S.A., Paris, France, a corporation of France
Filed Oct. 1, 1957, Ser. No. 687,387
Claims priority, application France June 21, 1957
2 Claims. (Cl. 167—65)

This invention relates to compositions that are useful in combating the influenza virus. More particularly, the invention relates to 2-amino-3-arylimino-5-aryl-7-chloro-3,5-dihydrophenazines, such as the 2-amino-3-phenylimino - 5 - phenyl-7-chloro-3,5-dihydrophenazine, to a method of making these compounds and acid addition salts thereof, such as the hydrochloride salt, and to compositions comprising these compounds as active constituents.

2-amino - 3 - arylimino - 5 - aryl-7-chloro-3,5-dihydrophenazines may be illustrated by the general formula

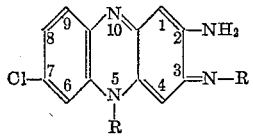

wherein R represents a phenyl group.

2-amino - 3 - phenylimino - 5 - phenyl-7-chloro-3,5-dihydrophenazine has been prepared in the past by means of an oxidizing condensation of two molecules of 2-amino-5-chloro-diphenylamine with ferric chloride (Ernst 1890, Ber. 23, p. 3426; Kehrmann, Guggenheim, 1901, Ber. 34, p. 1219). However, the proper structure of this compound was not determined until Barry et al. (J. Chem. Soc. 1956, p. 899) were able to demonstrate that the compound produced by oxidizing 2-amino-5-chloro-diphenylamine with ferric chloride was identical with the dyestuff obtained upon oxidizing this compound with benzoquinone. The product obtained by either process has the amino and phenylimino groups in positions which are exactly the reverse of those of an originally assumed chloro-2-anilino aposafranine.

Whichever method of preparation is used, the resulting dyestuff is highly contaminated with foreign materials. Because of the required chromatographic purification, the yields are only 20% of the theoretical and less.

The compound is formed according to the following reaction scheme:

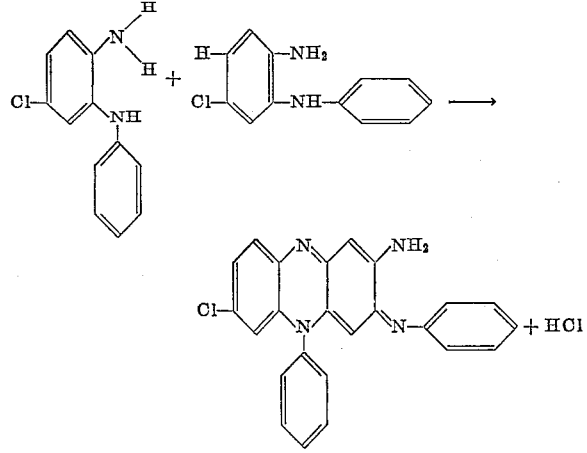

The use of various other oxidizing agents currently employed in dyestuff syntheses did not substantially improve the yields.

I have discovered that the metals of the platinum family (Re, Os, Ir, Pt) constitute highly active oxidation catalysts which, in the presence of oxygen, cause the conversion of 5-chloro-2-amino-diarylamines at high yields into the desired dyestuffs, namely, materials having an arylimino group at the 3-position.

I found it particularly advantageous to operate at slightly increased temperatures and use the free bases in aqueous acetic acid.

The hydrochloric acid set free during the oxidizing condensation process forms an addition salt with the phenazine dye.

After filtering off the catalyst, the reaction solution is simply concentrated to cause crystallization of the desired product which readily separates in an entirely pure state.

The yields of this process are 80–85% of the theoretical.

PREPARATION OF 2-AMINO-3-PHENYLIMINO-5-PHENYL-7-CHLORO-3,5-DIHYDROPHENAZINE

While stirring vigorously and maintaining a temperature of about 60 to 65° C., a stream of oxygen is passed through a mixture of 500 g. of 2-amino-5-chloro-diphenylamine, 6,600 cc. of 85% aqueous acetic acid and 200 g. of platinized kieselguhr, prepared in the usual manner.

Almost instantaneously the solution assumes a red-violet color; the process is contained for 4 to 12 hours, depending on the activity of the catalyst, the increase of the quantity of chlorine ion present serving as the guiding principle.

The reaction mixture is filtered hot to separate the catalyst which is washed with aqueous acetic acid and can be used again indefinitely.

The solution is concentrated to about 2.5 liters and the crystalline precipitate occurring upon standing overnight is separated, washed on a filter with a small amount of pure acetic acid, then with iced ethanol and, finally, with isopropyl ether until the solvent effluent is practically colorless.

The acetic mother liquor and the washing solutions are combined and vacuum-concentrated to a volume of 600 cc. Separation of the precipitate formed upon standing for 48 hours yields a second batch of the same purity. Total yield: 80%.

2-amino - 3 - phenylimino - 5 - phenyl-7-chloro-3,5-dihydrophenazine and 3-arylimino - 5 - aryl homologues thereof were found to constitute extremely effective suppressors of the influenza virus in vitro as well as in vivo. According to this invention, salts, such as the hydrochloride salt of these compounds, are associated with various solid or liquid adjuvants compatible therewith. The resulting compositions may take the form of powders, capsules, cachets, tablets, pellets or any other form permitting oral use and subdivision into properly proportioned doses of active constituent. According to the various formulations, different adjuncts generally used in the preparation of powders, tablets, or pellets may be incorporated with the active constituent. The following adjuncts are cited as examples, without intending to thereby limit the invention in any manner.

Vegetable starches from: wheat, corn, cassava, arrow root, rice, potato.
Sugars: saccharose, lactose, glucose.
Polyhydric alcohols: sorbitol, mannitol.
Mineral compounds: dibasic calcium phosphate, calcium sulfate, acidic absorbent earths, talcum, colloidal silica.
Gums and thickeners: tragacanth, Sterculia, alginic acid, sodium alginate, etc.
Various lubricants: liquid petrolatum, cacao butter, stearic acid or other fatty acids.

The percentage of active ingredient in the compositions may be varied within a range at which the active ingredient will provide a suitable dosage. In the use of the composition several unit dosage forms may be administered at substantially the same time.

It is preferred to use not less than about 0.5 g. of the active agent per dosage unit, although smaller amounts have shown to be effective. Activity increases with the concentration of the active ingredient. It has been found that the active agent per dosage unit may be 6 g., 8 g., or 11 g., or even higher. Tablets, for example, containing 200 mg. to 500 mg. of the active ingredient, are particularly useful in combating influenza virus in humans.

Inasmuch as the active material in most cases is not water-wettable, surface-active agents such as glycol esters and ethers, polyethylene glycols, polyhydric alcohols and condensation products of polyhydric alcohols with ethylene oxide or condensation products of ethylene oxide with polyhydroxypropylene glycol must be incorporated in the composition.

In addition to the foregoing, the invention comprises the use of compositions intended for rectal application in form of suppositories whose vehicles may consist of cacao butter or, generally, of glycerin fatty acid esters in their natural forms or chemically modified by hydrogenation, transesterification with different polyhydric alcohols or polyethylene glycols. To these mixtures may be added mono- or di-glycerides, surface-active agents, in order to promote the aqueous dispersion of the composition.

Finally, the invention includes compositions adapted for topical use of the active material, such as solutions for gargling after dilution, solutions or suspensions for daubing the throat, solutions to serve as nasal spray, ophthalmic ointments, etc.

The following examples are listed to illustrate the scope of the afore-described compositions, wherein the active ingredient is preferably 2-amino-3-phenylimino-5-phenyl-7-chloro-3,5-dihydrophenazine hydrochloride.

*Cachets*

Formula I:                                            Mg.
    Active constituent_____ 200
    Polyethylene glycol monostearate_____ 1.80
    Saccharose _____ 27.20
    Colloidal silica_____ 26.35
    Converted starch (hydrolyzed vegetable starch) _____ 4.65
        Each cachet weighing_____ 260

Formula II:                                           Mg.
    Active constituent_____ 500
    Polyethylene glycol monostearate_____ 2.165
    Saccharose _____ 47.835
    Colloidal silica_____ 63.750
    Converted starch (hydrolyzed vegetable starch) _____ 11.250
        Each cachet weighing_____ 625

*Powder With Fruit Aroma*

Formula I:
    Active constituent_____g__ 5
    Skimmed dry milk_____g__ 25
    Saccharose _____g__ 69.50
    Polyethylene glycol monostearate_____g__ 0.50
    Raspberry concentrate_____cc__ 1.50

1 level teaspoon contains 2 g. of the mixture, i.e., 100 mg of the active constituent.

Formula II:
    Active constituent_____g__ 12.50
    Skimmed dry milk_____g__ 56.85
    Saccharose _____g__ 30.00
    Polyethylene glycol monostearate_____g__ 0.65
    Raspberry concentrate_____cc__ 1.50

1 level teaspoon contains 2 g. of the mixture, i.e., 250 mg. of the active constituent.

*Tablets*

Formula I:                                            Mg.
    Active constituent_____ 200
    Potato starch_____ 117.13
    Polyethylene glycol monostearate_____ 2.80
    Citric acid_____ 0.01
    Trisodium citrate_____ 0.06
    Talcum _____ 30
        Each tablet weighs_____ 350

Formula II:
    Active constituent_____ 500
    Potato starch_____ 15.93
    Colloidal silica_____ 85
    Converted starch_____ 15
    Polyethylene glycol monostearate_____ 4
    Citric acid_____ 0.01
    Trisodium citrate_____ 0.06
    Talcum _____ 30
        Each tablet weighs_____ 650

*Suppositories*

Formula I:                                            G.
    Active constituent_____ 0.500
    Cacao butter_____ 1.300
                                              _____
                                              1.800

Formula II:
    Active constituent_____ 1.25
    Glycerin monostearate_____ 0.25
    Cacao butter_____ 1.50
                                              _____
                                              3.00

Formula III:
    Active constituent_____ 1.50
    Mixture of complex glycerides_____ 1.50
                                              _____
                                              3.00

*Eye Ointment*

Active constituent_____ 2
Distilled water_____ 4.90
Phenyl-mercuric nitrate_____ 0.001
Polysorbate 80_____ 2.771
Cholesterol _____ 4.620
Liquid petrolatum, Codex_____ 15.908
White petrolatum_____ 69.80

*Mouth Wash*

Formula I:
    Active constituent_____ 0.5
    Polysorbate 80_____ 5.0
    Glycerin _____ 94.5
                                              _____
                                              100.0

Formula II:
    Active constituent_____ 0.5
    Polyethylene glycol monostearate_____ 10
    Glycerin _____ 89.5
                                              _____
                                              100.0

*Solution for Gargling*

Formula I:
    Active constituent_____g__ 0.5
    Absolute alcohol_____cc__ 40
    Glycerin _____cc__ 60

Formula II:
    Active constituent_____g__ 0.5
    Absolute alcohol_____cc__ 30
    Polyethylene glycol monostearate_____g__ 10
    Glycerin _____cc__ 60

As far as I am aware, the physiological properties of 2-amino-3-phenylimino - 5 - phenyl-7-chlor-3,5-dihydrophenazine and of the afore-described homologues of this compound have not been heretofore used for therapeutic purposes, particularly in the treatment of influenza.

The efficacy of 2-amino-3-phenylimino-5-phenyl-7-chloro-3,5-dihydrophenazine as suppressor of the influenza virus is shown in the following experiments.

*Experimental technique.*—Young mice having an average weight of 16 g. were inoculated through the nasal passages, under ether anesthesia, with a 1/50 virus emulsion, obtained from ground lungs of mice that had been infected for three days.

The treatment starts 3 hours later, the substance tested (2-amino-3-phenylimino-5-phenyl-7-chloro-3,5-dihydrophenazine hydrochloride) being administered, once a day, by gastric tube for 10 consecutive days.

The surviving animals were killed on the 15th day and subjected to autopsy, as were those animals that had died previously. The extent of their pulmonary lesions was evaluated and calculated to establish the degree of morbidity.

An infection of average virulence (resulting in the death of about 60 to 80% of the control animals) is best suited to evaluate the results.

For each experiment comprising 10 to 40 animals treated simultaneously with an equal number of control animals, an activity index is established which takes into account the mortality of the control animals and the degree of infection of all surviving animals.

The index range is from 0 (no effect) to 100 (complete curative effect).

*Results.*—Using an optimum dose of 100 mg. per kilogram of body weight (2 mg. per day per mouse weighing 20 g.), the indices of 9 successive experiments were as follows: 85–94–97–96–94–96–84–88–80; or an average of 90.4.

The experiments were repeated over a period of several months, always at a standard set at 100 mg./kg., involving 130 test animals and 130 control animals. Six of the test animals and 88 of the control animals died, which corresponds to a ratio of 4.6% to 67.7%; or to a mortality reduction of 93%.

It is to be noted that the foregoing results do not reflect a choice or selection of successful experiments, but represent a statistical compilation of the total number of tests carried out at comparable experimental conditions, as shown in the drawing. The following facts were established:

If the daily dose is doubled, the curative action increases only slightly.

If the dose is decreased to 50 mg./kg. the curative effect diminishes considerably. For three experiments with 10, 10, and 20 test animals, the indices were 55, 47, and 40, respectively.

Shortening of the treatment from 10 days to only 3 days, the dose being 100 mg./kg., does not change the results: one animal out of 10 thus treated died on the 13th day, the 9 others killed on the 15th day showed practically no lesions. 9 out of 10 control animals died.

*Delayed treatment.*—In the foregoing experiments the treatment was started 3 hours after inoculation. If commencement of the treatment was delayed 24 hours (the extremely quick development of the influenza virus is known), the results were entirely comparable. There was no mortality among the mice treated, whereas 9/10 of the control animals died. The activity index is 94%.

*Preventive effect.*—The slow elimination of the material permitted an anticipation of the possibility of a preventive effect; this was confirmed by the following experiment: 10 mice are given 5 daily doses of 100 mg./kg. and are then infected, simultaneously with 10 control animals, 48 hours after administration of the last dose. The mortality rate was 5/10 from the 5th to the 9th day. No lesions were found in the surviving animals.

10/10 control animals died within 6 days.

Activity index: 60.

In a second similar test the index was 63.

*Virucidal action in vitro.*—Active substance in concentrations of 1 mg., 0.1 mg., 0.01 mg. per cc. was added to the virus-carrying emulsion and, after an incubation time of 3 hours at 37° C. and 24 hours at 0° C., test animals were inoculated.

After 15 days, the 3 lots showed, respectively, the following indices: 100, 84, 69.

As can be seen, virucidal action is close to 70% at a concentration of 10γ per cc. and 100% at a concentration of 1 mg. per cc.

*Tolerance.*—2-amino-3-phenylimino-5-phenyl-7-chloro-3,5-dihydrophenazine is very little toxic when taken by mouth. The solubility of the compound is too low to be administered otherwise.

A dose of 50 mg. per mouse weighing 20 g. is tolerated.

A daily dose of 20 mg. administered by tube and repeated for 30 days in succession produces no disorder; these findings were confirmed by tests with other laboratory animals.

*Tolerance tests on humans.*—Daily doses progressively rising from 0.5 g. to 11 g. were administered to 13 patients over periods ranging from 8 to 21 days, depending upon the individual case.

Neither tolerance effects nor general toxicity manifestations were observed either during or after the treatment. Hepato-renal tests were unchanged; there was no cardiovascular action, the red blood cell and thrombocyte (platelet) counts were unchanged.

No change in the leukocyte balance could be observed in hematologically normal individuals.

Visible coloring of the skin could be observed only after administration of large doses over an extended period.

In all cases the urine had a currant-red discoloration, and elimination of discolored urine continued for several days after cessation of the treatment. It was unequivocally established that this discoloring was not due to the presence of red blood-corpuscles in the urine.

With the exception of a slight antitubercular activity, the compound has no effect on bacterial infections, but it showed experimentally equally active against the A-strain (PR 8) and the B-strain (Lee) of the influenza virus.

I claim:

1. A method of combating influenza virus which comprises subjecting such organisms to a composition comprising not less than 0.5 g. of a member selected from the group consisting of 2-amino-3-arylimino-5-aryl-7-chloro-3,5-dihydrophenazine and acid addition salts thereof.

2. A method of combating influenza which comprises administering a composition comprising not less than 0.5 g. of 2-amino-3-arylimino-5-aryl-7-chloro-3,5-dihydrophenazine to a human host infected with influenza virus.

References Cited in the file of this patent

UNITED STATES PATENTS

| | | |
|---|---|---|
| 2,110,614 | Vivian et al. | Mar. 8, 1938 |
| 2,875,204 | Barry et al. | Feb. 24, 1959 |
| 2,890,981 | Ursprung | June 16, 1959 |
| 2,891,062 | Ursprung | June 16, 1959 |

OTHER REFERENCES

Symposium, Royal Society of Medicine, London, April 25, 1958, "Report of a Symposium on Clinical Trials," page 11.